(12) United States Patent
Bae

(10) Patent No.: US 9,338,437 B2
(45) Date of Patent: May 10, 2016

(54) APPARATUS AND METHOD FOR RECONSTRUCTING HIGH DENSITY THREE-DIMENSIONAL IMAGE

(71) Applicant: HANWHA TECHWIN CO., LTD., Changwon-si (KR)

(72) Inventor: Soon-Min Bae, Changwon (KR)

(73) Assignee: Hanwha Techwin Co., Ltd., Changwon-Si (KR)

( * ) Notice: Subject to any disclaimer, the term of this patent is extended or adjusted under 35 U.S.C. 154(b) by 444 days.

(21) Appl. No.: 13/728,065

(22) Filed: Dec. 27, 2012

(65) Prior Publication Data
US 2013/0258064 A1   Oct. 3, 2013

(30) Foreign Application Priority Data
Apr. 3, 2012  (KR) .................. 10-2012-0034580

(51) Int. Cl.
*H04N 13/02* (2006.01)
*H04N 5/232* (2006.01)
*H04N 13/00* (2006.01)
*G06T 5/00* (2006.01)
*G06T 7/00* (2006.01)
*G06T 3/40* (2006.01)

(52) U.S. Cl.
CPC .............. *H04N 13/0239* (2013.01); *G06T 3/40* (2013.01); *G06T 5/002* (2013.01); *G06T 7/0075* (2013.01); *H04N 5/23232* (2013.01); *H04N 13/0007* (2013.01); *G06T 2200/04* (2013.01); *H04N 2013/0081* (2013.01)

(58) Field of Classification Search
None
See application file for complete search history.

(56) References Cited

U.S. PATENT DOCUMENTS

| 6,028,672 | A | 2/2000 | Geng | |
|---|---|---|---|---|
| 6,856,314 | B2 | 2/2005 | Ng | |
| 7,137,319 | B2 | 11/2006 | Hough | |
| 8,150,960 | B2 * | 4/2012 | Kumbalimutt | |
| 2007/0126743 | A1 * | 6/2007 | Park et al. | 345/474 |
| 2008/0144925 | A1 * | 6/2008 | Zhu et al. | 382/154 |
| 2010/0173269 | A1 * | 7/2010 | Puri et al. | 434/127 |
| 2010/0220932 | A1 * | 9/2010 | Zhang et al. | 382/209 |
| 2010/0315490 | A1 * | 12/2010 | Kim et al. | 348/47 |
| 2011/0050864 | A1 * | 3/2011 | Bond | 348/51 |

(Continued)

FOREIGN PATENT DOCUMENTS

CN          101312539 A          11/2008

OTHER PUBLICATIONS

Byun et al., "A Study on the 3D Shape Reconstruction Algorithm of an Indoor Environment Using Active Stereo Vision," Oct. 1, 2009, pp. 13-22.
Koo et al., "Extraction of the Disparity Using the Epipolar Geometry," pp. 21-24.

(Continued)

*Primary Examiner* — Frederick Bailey
*Assistant Examiner* — Talha Nawaz
(74) *Attorney, Agent, or Firm* — Sughrue Mion, PLLC

(57) ABSTRACT

Apparatus and method for reconstructing a high-density three-dimensional (3D) image are provided. The method includes: generating an initial 3D image by matching a first image captured using a first camera and a second image captured using a second camera; searching for a first area and a second area from the initial 3D image by using a number of characteristic points included in the initial 3D image; detecting a plane from a divided first area; filtering a divided second area; and synthesizing the detected plane and the filtered second area.

18 Claims, 13 Drawing Sheets
(5 of 13 Drawing Sheet(s) Filed in Color)

(56) References Cited

U.S. PATENT DOCUMENTS

| | | | |
|---|---|---|---|
| 2011/0128282 A1* | 6/2011 | Wang et al. | 345/419 |
| 2011/0182477 A1* | 7/2011 | Tamrakar et al. | 382/110 |
| 2011/0216090 A1* | 9/2011 | Woo et al. | 345/633 |

OTHER PUBLICATIONS

Kwon et al., "Feature Point Matching using Epipolar Geometry," pp. 446-448.

Communication from the Chinese Patent Office issued Dec. 1, 2015 in counterpart Chinese Patent Application No. 201380018460.0.

\* cited by examiner

IMAGE OF FIRST CAMERA (100)   IMAGE OF SECOND CAMERA (200)

APPARATUS AND METHOD FOR RECONSTRUCTING HIGH DENSITY THREE-DIMENSIONAL IMAGE

CROSS-REFERENCE TO RELATED PATENT APPLICATION

This application claims priority from Korean Patent Application No. 10-2012-034580, filed on Apr. 3, 2012, in the Korean Intellectual Property Office, the disclosure of which is incorporated herein in its entirety by reference.

BACKGROUND

1. Field

Apparatuses and methods consistent with exemplary embodiments relate to a multiple-camera system, and more particularly, to reconstructing a high-density three-dimensional image by performing plane detection and smoothing with respect to an initial three-dimensional image that is generated by image matching.

2. Description of the Related Art

In general, a three-dimensional (3D) image may be defined in two respects. First, a 3D image is constructed using depth information so that a user may feel that a portion of an image jumps out of a screen. Here, depth information refers to information about a distance between a camera and a two-dimensional (2D) image, represented as an image. Thus, the 2D image may be represented as a 3D image by using the depth information. Second, a 3D image is constructed basically to provide various points of view to a user to give a sense of reality.

A stereoscopic image may be obtained by using a binocular camera system or a multi-viewpoint camera system. The binocular camera system uses a left image and a right image captured using two cameras to provide stereoscopic effects to a user. The multi-viewpoint camera system provides various viewpoints to a user by spatially synthesizing images that are captured using two or more cameras.

SUMMARY

One or more exemplary embodiments provide an apparatus and method for reconstructing a high-density three-dimensional (3D) image by performing plane detection and smoothing with respect to an initial 3D image that is generated by matching images captured using a plurality of cameras.

According to an aspect of an exemplary embodiment, there is provided a method of reconstructing a high-density 3D image, the method including: generating an initial 3D image by matching a first image captured using a first camera and a second image captured using a second camera; searching for a first area and a second area from the initial 3D image by using a number of characteristic points included in the initial 3D; detecting a plane from the first area; filtering the second area; and synthesizing the detected plane and the filtered second area.

The method may further include, after generating the initial 3D image, dividing one of the first image and the second image into segments; and applying segmentation information to the initial 3D image.

The searching for the first and second areas may include searching for at least one first area including characteristic points a number of which is equal to or greater than a set number. The searching for the first and second areas may further include searching for at least one second area including the characteristic points a number of which is less than the set number.

The filtering may include smoothing depth, corresponding to Z coordinates of the characteristics points while preserving contrast equal to or greater than a set value with respect to the second area.

The generating the initial 3D image may include: extracting the characteristic points from the first image and the second image; matching the characteristic points of the first image and the characteristic points of the second image; calculating 3D coordinates of the matched characteristic points; and generating the initial 3D image.

The matching the characteristic points may include: setting a first window including a characteristic point in the first image; searching for a second window of which luminance differs by the least degree from luminance of the first window; and selecting a matching characteristic point which is the most similar to the characteristic point in the first window among at least one characteristic point in the second window.

The calculating the 3D coordinates may include: calculating two-dimensional (2D) coordinates of the matched characteristic points with respect to the first and second images; and calculating 3D coordinates of the matched characteristic points by using a distance between the first and second cameras and angles of the first and second cameras with respect to the characteristic points.

The calculating the 3D coordinates may include: calculating two-dimensional (2D) coordinates of the matched characteristic points with respect to the first and second images; and calculating 3D coordinates of the matched characteristic points by using a distance between the first and second cameras and angles of the first and second cameras with respect to the characteristic points. In the generating the initial 3D image comprises: extracting characteristic points from the first image and the second image; matching the characteristic points of the first image and the characteristic points of the second image; calculating 3D coordinates of the matched characteristic points; and generating the initial 3D image using the 3D coordinates of the matched characteristic points.

The filtering may include smoothing depth, corresponding to Z coordinates of the characteristics points while preserving contrast equal to or greater than a set value with respect to the second area.

The searching for the first and second areas may include searching for at least one first area including characteristic points equal to or greater than a set number and at least one second area including the characteristic points less than the set number.

According to an aspect of another exemplary embodiment, there is provided an apparatus for reconstructing a high-density 3D image, the apparatus including: an image matching unit which matches a first image captured using a first camera and a second image captured using a second camera to generate an initial 3D image; and a 3D image reconstruction unit which divides the initial 3D image into a first area and a second area to detect a plane from the first area, filters the second area, and synthesizes the plane detected from the first area and the filtered second area to generate the high-density 3D image.

The image matching unit may include: a characteristic point extracting unit which extracts characteristic points from the first image and the second image; a characteristic point matching unit which matches the characteristic points of the first image and the characteristic points of the second image; a 3D coordinate calculation unit which calculates 3D coordinates of the matched characteristic points; and an initial 3D image generating unit which generates an initial 3D image by using the 3D coordinates of the matched characteristic points.

The 3D image reconstruction unit may include: a dividing unit which divides one of the first image and the second image, and applying information about the division to the initial 3D image; a searching unit which searches for the first area and the second area from the divided image by using a number of characteristic points included in the divided image; a plane detection unit which detects a plane from the first area; and a filtering unit which filters the second area.

The searching unit may search for at least one first area including a set number of the characteristic points, and at least one second area including less than the set number of the characteristic points.

The filtering unit may filter the second area to smooth depth corresponding to Z coordinates of the characteristic points while the depth discontinuities with respect to the division boundaries.

The 3D image reconstruction unit may include: a dividing unit which divides one of the first image and the second image, and applies information about the division to the initial 3D image; a searching unit which searches for the first area and the second area from the divided image by using a number of 3D characteristic points included in the divided image; a plane detection unit which detects a plane from the first area; and a filtering unit which filters the second area.

According to an aspect of another exemplary embodiment, there is provided a computer readable recording medium having embodied thereon a program for executing a method of reconstructing a high-density 3D image, the method including: generating an initial 3D image by matching a first image captured using a first camera and a second image captured using a second camera; searching for a first area and a second area from the initial 3D image by using a number of characteristic points included in the initial 3D image; detecting a plane from the first area; filtering the second area; and synthesizing the detected plane and the filtered second area.

BRIEF DESCRIPTION OF THE DRAWINGS

The patent or application file contains at least one drawing executed in color. Copies of this patent or patent application publication with color drawing(s) will be provided by the Office upon request and payment of the necessary fee. The above and other aspects will become more apparent by describing in detail exemplary embodiments with reference to the attached drawings, in which.

DETAILED DESCRIPTION OF THE EXEMPLARY EMBODIMENTS

Figure 1:
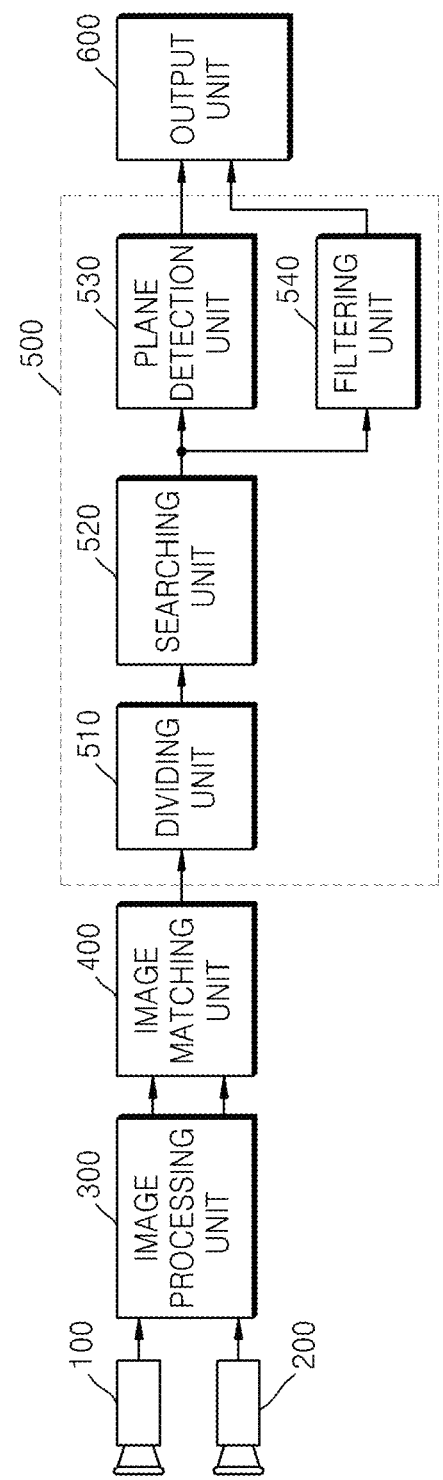
FIG. 1 is a block diagram illustrating a high-density three-dimensional (3D) image reconstructing apparatus according to an exemplary embodiment.

Expressions such as "at least one of," when preceding a list of elements, modify the entire list of elements and do not modify the individual elements of the list.

As the inventive concept allows for various changes and numerous embodiments, particular exemplary embodiments will be illustrated in the drawings and described in detail in the written description. However, this is not intended to limit the inventive concept to particular modes of practice, and it is to be appreciated that all changes, equivalents, and substitutes that do not depart from the spirit and technical scope of the inventive concept are encompassed in the inventive concept. In the description, certain detailed explanations of related art are omitted when it is deemed that they may unnecessarily obscure the essence of the invention.

While such terms as "first," "second," etc., may be used to describe various components, such components must not be limited to the above terms. The above terms are used only to distinguish one component from another.

The terms used in the present specification are merely used to describe particular exemplary embodiments, and are not intended to limit the inventive concept. An expression used in the singular encompasses the expression of the plural, unless it has a clearly different meaning in the context. In the present specification, it is to be understood that the terms such as "including" or "having," etc., are intended to indicate the existence of the features, numbers, steps, actions, components, parts, or combinations thereof disclosed in the specification, and are not intended to preclude the possibility that one or more other features, numbers, steps, actions, components, parts, or combinations thereof may exist or may be added.

The inventive concept may be described in terms of functional block components and various processing steps. Such functional blocks may be realized by any number of hardware and/or software components configured to perform the specified functions. For example, the inventive concept may employ various integrated circuit components, e.g., memory elements, processing elements, logic elements, look-up tables, and the like, which may carry out a variety of functions under the control of one or more microprocessors or other control devices. Similarly, where the elements of the inventive concept are implemented using software programming or software elements the invention may be implemented with any programming or scripting language such as C, C++, Java, assembler, or the like, with the various algorithms being implemented with any combination of data structures, objects, processes, routines or other programming elements. Functional aspects may be implemented in algorithms that are executed on one or more processors. Furthermore, the inventive concept could employ any number of related art techniques for electronics configuration, signal processing and/or control, data processing and the like. The words "mechanism" and "element" are used broadly and are not limited to mechanical or physical embodiments, but can include software routines in conjunction with processors, etc.

Exemplary embodiments of the inventive concept will be described below in more detail with reference to the accompanying drawings. Those components that are the same or are in correspondence are rendered the same reference numeral regardless of the figure number, and redundant explanations are omitted.

FIG. 1 is a block diagram illustrating a high-density three-dimensional (3D) image reconstructing apparatus according to an exemplary embodiment.

Referring to FIG. 1, the high-density 3D image reconstructing apparatus includes a first camera 100, a second camera 200, an image processing unit 300, an image matching unit 400, a high-density 3D image reconstructing unit 500, and an output unit 600.

The first camera 100 and the second camera 200 respectively refer to a left camera and a right camera that capture images of an object by using, for example, a complementary metal-oxide semiconductor (CMOS) module or a charge coupled device (CCD) module. First and second input images (or video images) are supplied to a CMOS module or a CCD module through a lens, and the CMOS module or the CCD module converts an optical signal of the object that has been transmitted through the lens, into an electrical signal (photographing signal).

The image processing unit 300 performs image signal processing for improving image quality, such as noise reduction, gamma correction, color filter array interpolation, color matrix processing, color correction, color enhancement or the like, to first and second image signals respectively output from the first camera 100 and the second camera 200.

In addition, the image processing unit 300 may perform image signal processing to improve image quality, and may compress generated image data to generate an image file, or may restore image data from the image file. An image compression format may be reversible or irreversible.

Also, the image processing unit 300 may functionally perform color processing, blurring, edge emphasis processing, an image interpretation process, an image recognition process, an image effects process, etc. Examples of image recognition processing are face recognition, scene recognition, etc. For example, image generation and an image synthesis process such as luminance level control, color correction, contrast control, outline enhancement control, an image division process, or character image creation may be performed.

Figure 2:
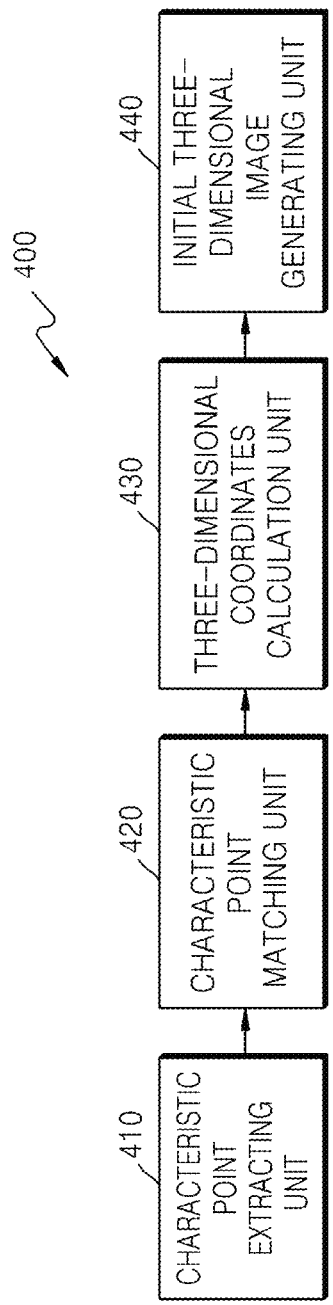
FIG. 2 is a detailed block diagram illustrating an image matching unit of FIG. 1 according to an exemplary embodiment.

The image matching unit 400 matches the first image and the second image on which image processing is performed to generate an initial 3D image. FIG. 2 is a detailed block diagram of the image matching unit 400.

Referring to FIG. 2, the image matching unit 400 includes a characteristic point extracting unit 410, a characteristic point matching unit 420, a 3D coordinate calculating unit 430, and an initial 3D image generating unit 440.

The characteristic point extracting unit 410 extracts a corner (edge) as a characteristic point from the first and second images by using a scale invariant feature transform (SIFT) algorithm or a HARRIS algorithm.

SIFT, which is a representative algorithm for extracting a characteristic point of an image, has been suggested by Lowe in <D. G. Lowe, "Distinctive image features from scale-invariant key points", Int. J. Comput. Vision 60 (2), 91-110, 2004>.

Characteristic points extracted by using the SIFT algorithm have excellent characteristics in that they are not affected by scales of image, rotation, distortion, variation in 3D viewpoints or the like. According to the SIFT algorithm, first, a pixel luminance level of a digital image is varied using a Gaussian filter to perform stepwise blurring. Here, blurring is repeated while varying a scale of an image. Next, a difference of Gaussian (DOG) between images that are blurred stepwise on the same scale is calculated. Next, a characteristic point is selected according to a predetermined standard based on the calculated DOG. Next, gradients of all pixels of an original image are calculated to generate a gradient map. Then, a descriptor of characteristic points that are selected using the gradient map is calculated. Finally, final characteristic point data is generated. The characteristic point data includes a coordinate of a characteristic point and a descriptor of the characteristic point.

The Harris algorithm, which is another representative algorithm for extracting a characteristic point of an image, has been suggested by Chris Harris and Mike Stephens in <A Combined Corner and Edge Detector Proceedings of the Fourth Alvey Vision Conference, Manchester, pp 147-151, 1988>.

According to the Harris algorithm, there is basically a window that moves vertically and horizontally within an image, and a variation in values of pixels in the window is analyzed to find a corner point. If there is no variation in luminance of an object in the image, there may be no variation in pixel values even when the window is moved vertically or horizontally. However, when the window meets a vertical boundary line of an image while moving horizontally, there is a large variation in pixel values in the window that is moving horizontally, but the pixel values may not vary with respect to the window that moves vertically. Then, when assuming that the window moves not only horizontally but also vertically, the window will definitely pass through a point where there is a large variation in the pixel values. In other words, this point is a final corner point. The corner point is found even when an image is rotated.

Figure 3A:
FIG. 3A illustrates a first image captured using the first camera 100.
Figure 3B:
FIG. 3B illustrates a second image captured using the second camera 200, according to an exemplary embodiment, according to an exemplary embodiment.
Figure 4A:
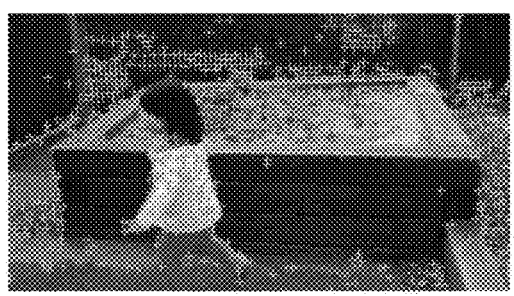
FIGS. 4A and 4B respectively illustrate the first image and the second image of FIGS. 3A and 3A, from which corners are extracted by the characteristic point extracting unit 410 as characteristic points, according to an exemplary embodiment.
Figure 4B:

FIG. 3A illustrates a first image captured using the first camera 100, and FIG. 3B illustrates a second image captured using the second camera 200. FIGS. 4A and 4B respectively illustrate the first image and the second image of FIGS. 3A and 3A, from which corners are extracted by the characteristic point extracting unit 410 as characteristic points.

The characteristic point matching unit 420 matches the characteristic points of the first image and the second image. In particular, the characteristic point matching unit 420 uses epipolar geometry and an area-based matching method.

First, epipolar geometry will be described with reference to FIG. 5. When images are obtained using the first camera 100 and the second camera 200, a spatial point is projected into the first camera 100 and the second camera 200 to generate a pair of points, referred to as a conjugate pair, on the image. A plane formed by centers of lenses of the first and second cameras 100 and 200 and a point P of an object in space projected by the first and second cameras 100 and 200 is referred to as an epipolar plane, and a line of intersection of the epipolar plane and an image plane is defined as an epipolar line.

Figure 5:
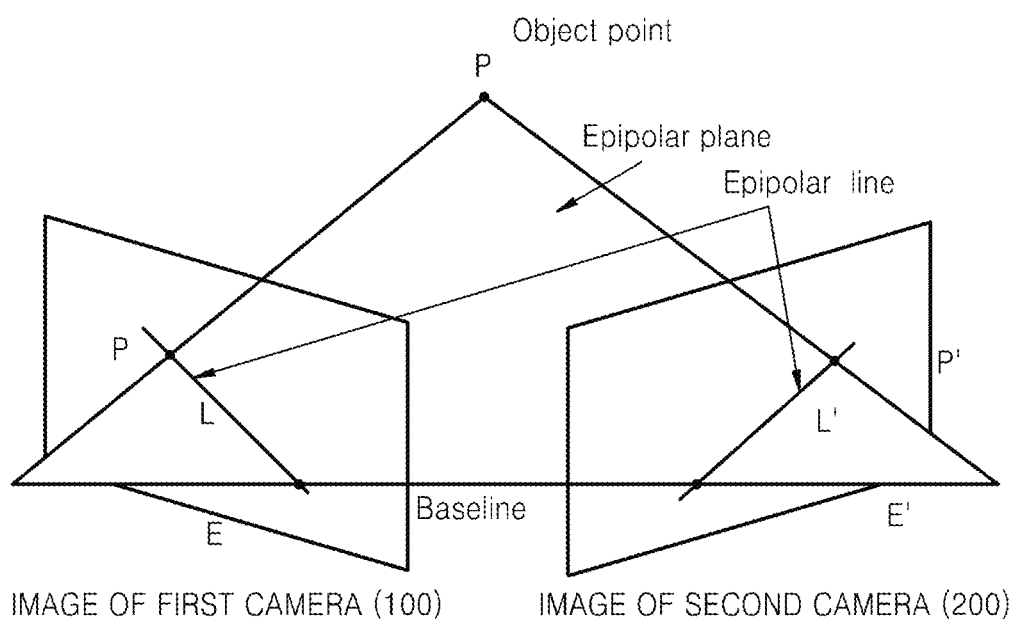
FIG. 5 is a schematic view for explaining epipolar geometry for image matching of FIG. 1, according to an exemplary embodiment.

That is, as illustrated in FIG. 5, an epipolar line is defined by a line formed by a plane defined by centers of left and right lenses, meeting the object point P in 3D space. As two points formed on an image have the same Y coordinates, a point on the second image corresponding to a particular coordinate of the first image is on the epipolar line. Although an object occurring on the first image may or may not occur also on the second image, if the object occurs on the second image, the object is necessarily on the epipolar line.

To find a matching point of the second image with respect to a characteristic point of the first image, the characteristic point matching unit 420 sets a search area and finds candidate characteristic points within the search area, and selects one characteristic point having a large similarity to the characteristics point of the first image, and sets the two characteristics points as matching pairs. The larger the search area, the higher the number of matching candidates, and thus, a time for conducting matching increases, and a probability of mismatching increases. Thus, the search area may be as small as possible. One of methods of narrowing the search area is using epipolar restriction conditions.

Figure 6A:
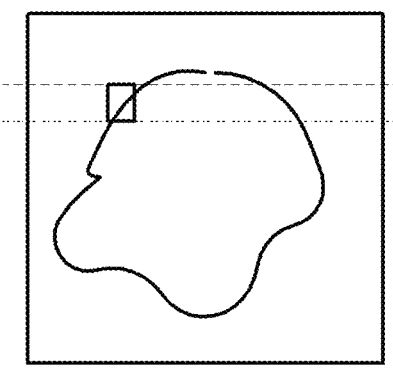
FIGS. 6A and 6B are schematic views for explaining restriction conditions regarding epipolar geometry for image matching of FIG. 1, according to an exemplary embodiment.
Figure 6B:
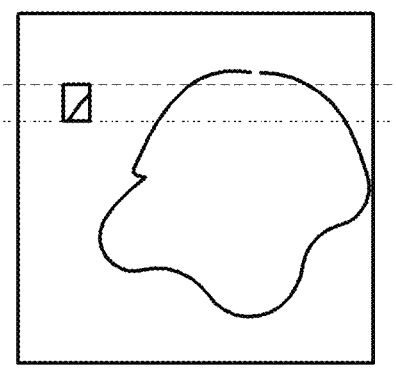

FIGS. 6A and 6B are schematic views for explaining restriction conditions regarding epipolar geometry for image matching of FIG. 1.

The area-based matching method performed under epipolar restriction conditions will be described with reference to FIGS. 6A and 6B. The characteristic point matching unit 420 sets a first window in a first image as a reference window (FIG. 6A), and searches for a second window (FIG. 6B) that has little luminance difference from that of the first window while convoluting the first window to the second image. A second window whose luminance differs by the least degree from that of the first window is determined as having the most similarity to the first window, and the first window and this second window are determined as a conjugate pair. When the epipolar restriction conditions as described above are used, a calculation amount which is the disadvantage of the area-based matching method may be effectively reduced.

Examples of the area-based matching method include a sum of absolute difference (SAD) algorithm, a sum of squared difference (SSD) algorithm, a zero mean sum of absolute difference (ZSAD) algorithm, and a zero mean sum of squared difference (ZSSD) algorithm.

Figure 7:
FIG. 7 is a photographic image showing a result of the image matching of FIG. 1, according to an exemplary embodiment.

FIG. 7 illustrates a matched image where a matching operation of the characteristic point matching unit 420 is performed, and shows conjugate pairs determined when matching the first and second images.

The 3D coordinate calculation unit 430 uses a triangulation method to calculate 3D coordinates of the matched characteristic points. The 3D coordinate calculation unit 430 calculates two-dimensional (2D) coordinates of characteristic points from the first image and the second image, that is, it calculates X coordinates and Y coordinates, and calculates a distance between the first camera 100 and the second camera 200 to the characteristic points using the triangulation method, to calculate final 3D coordinates by calculating the calculated distance as a depth value, that is, it calculates Z coordinates.

Figure 8:
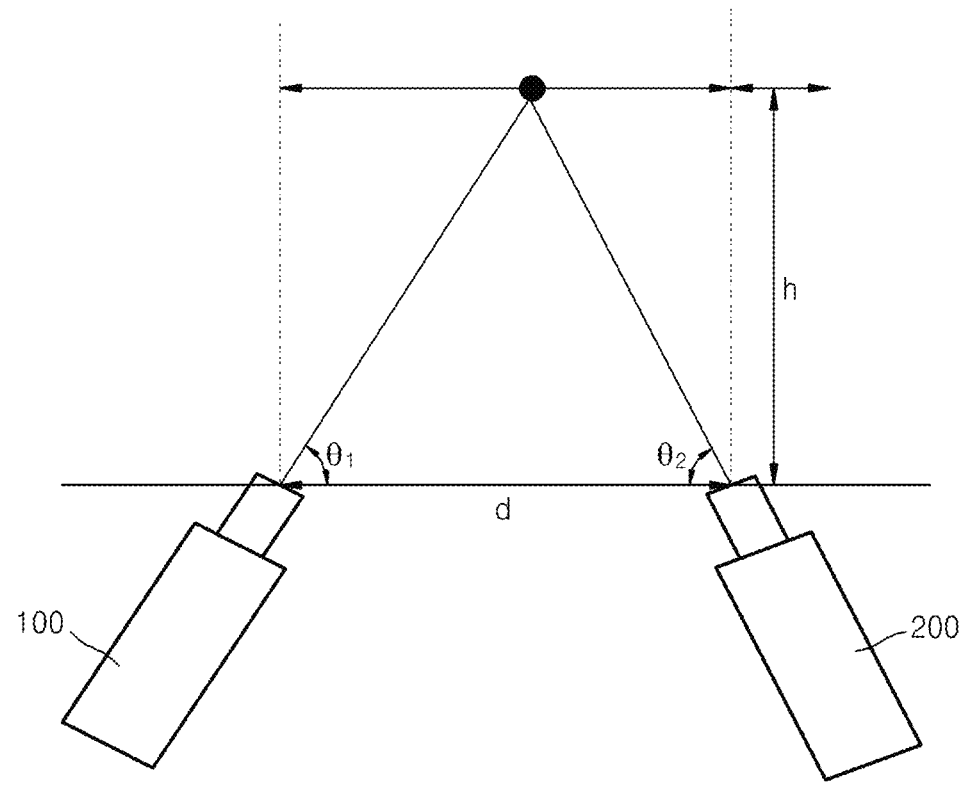
FIG. 8 is a schematic view for explaining calculation of distance information of matched images of FIG. 1, according to an exemplary embodiment.

FIG. 8 is a schematic view for explaining calculation of distance information of the matched images of FIG. 1.

Z-coordinates calculation using the triangulation method will be described with reference to FIG. 8. As illustrated in FIG. 8, when a distance d between a lens of the first camera 100 and a lens of the second camera 200 is known, and angle information θ1 from the first camera 100 to a characteristic point and angle information θ2 from the second camera 200 to the characteristic point are available, a distance h between the first camera 100 and the second camera 200 and the characteristic point may be calculated as given by Equation 1 below.

$$h = \frac{d}{\tan(90w - \theta 1) + \tan(90w - \theta 2)}$$ [Equation 1]

Accordingly, information about 3D coordinates (X, Y, Z) of all characteristic points of the matched image illustrated in FIG. 7 may be obtained.

Figure 9:
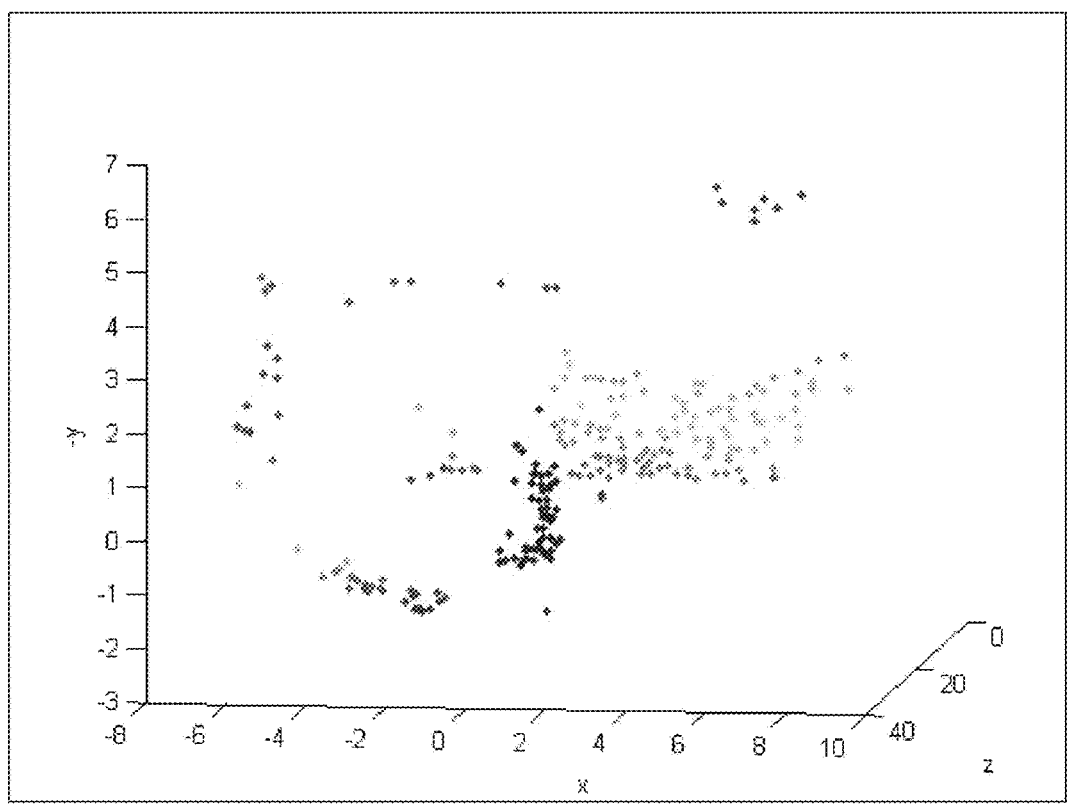
FIG. 9 illustrates an initial 3D image of FIG. 1, according to an exemplary embodiment.

The initial 3D image generating unit 440 uses the 3D coordinates all characteristic points of the matched to generate an initial 3D image. FIG. 9 illustrates an initial 3D image of FIG. 1; the darker the characteristic points, the farther they are from the first camera 100 and the second camera 200.

Referring to FIG. 1 again, when an initial 3D image is generated by using the image matching unit 400, the high-density 3D image reconstructing unit 500 divides the initial 3D image to detect a plane from divided regions of the image or filters the initial 3D image to generate a high density 3D image.

The high density 3D image reconstructing unit 500 includes a dividing unit 510, a searching unit 520, a plane detection unit 530, and a filtering unit 540.

Figure 10A:
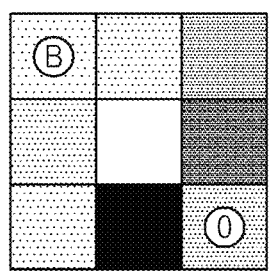
FIGS. 10A and 10B are schematic views for explaining a graph cut algorithm for dividing the initial 3D image of FIG. 1, according to an exemplary embodiment.
Figure 10B:
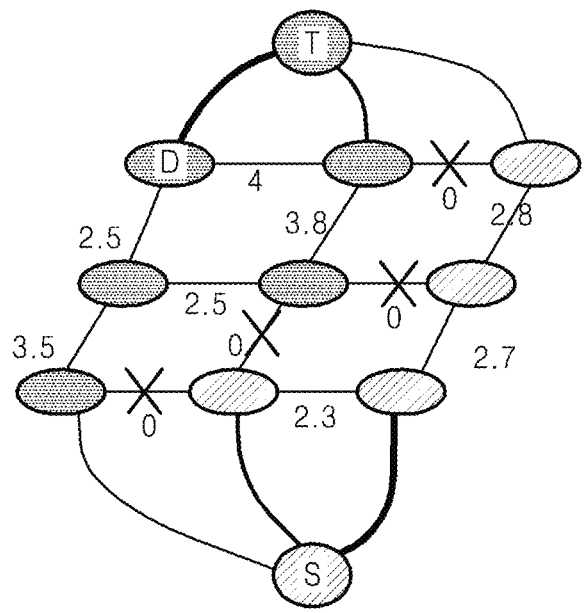
Figure 11:
FIG. 11 is a schematic view illustrating a result of division of an arbitrary image from an input image of FIG. 1, according to an exemplary embodiment.

The dividing unit 510 divides one of the first image and the second image by using a graph cut algorithm. The initial 3D image includes space information, and thus, may be divided into images theoretically, but in reality, it is impossible to divide the initial 3D image. Accordingly, one of the first image and the second image is divided, that is, a 2D image is divided, and division information is applied to the initial 3D image for use. FIGS. 10A and 10B are schematic views for explaining a graph cut algorithm for dividing the initial 3D image of FIG. 1. FIG. 10A illustrates an arbitrary image, and FIG. 10B is a graph regarding FIG. 10A. Referring to FIGS. 10A and 10B, in the graph cut algorithm, the image of FIG. 10A is converted into the graph illustrated in FIG. 10B, and edge weights of the graph are defined as correlations of pixel values and portions with remarkable differences in pixel luminance are cut. FIG. 11 is a schematic view illustrating a result of division of one of the first image and the second image, wherein corresponding division information is applied to the initial 3D image. Here, for example, the division information may be an edge weight of each graph in the case of a graph cut algorithm.

The searching unit 520 searches for at least one first area and at least one second area by using the number of characteristic points included in the divided images. The searching unit 520 searches for at least one area including a set number of characteristic points, for example, at least three characteristic points included in the divided image, and at least one second area including less than the set number of characteristic points, for example, less than three characteristic points included in the divided image.

The plane detection unit 530 detects a plane from the first area including three or more characteristic points. The plane detection unit 530 detects a plane from the first area by using a random sample consensus (RANSAC) algorithm and a plane equation.

By substituting 3D coordinates (X, Y, Z) calculated from a 3D image to the plane equation, planes may be detected. In Equation 2, a 3D plane equation is illustrated.

$$ax+by+cz+d=0 \quad \text{[Equation 2]}$$

Figure 12:
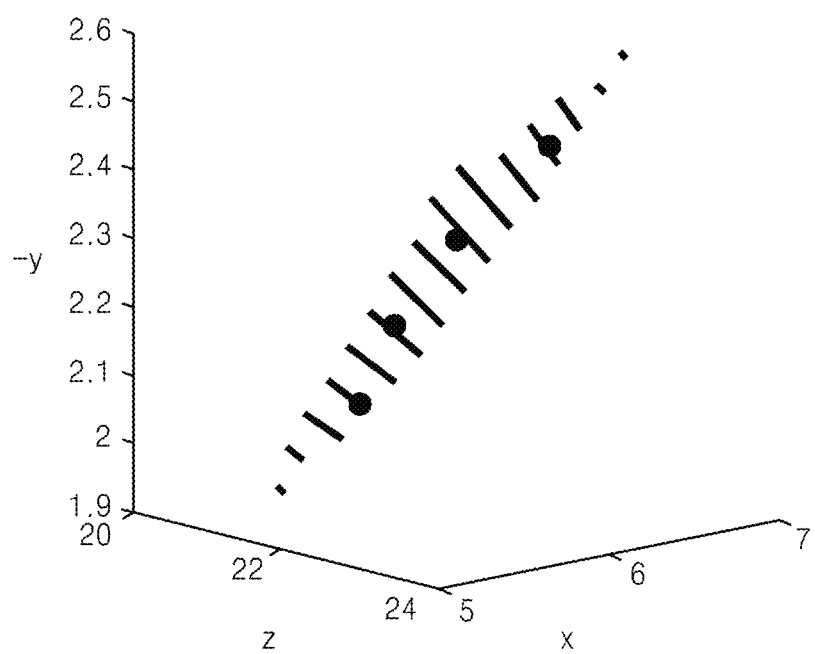
FIG. 12 is a graph for explaining plane detection of FIG. 1, according to an exemplary embodiment.

FIG. 12 illustrates an example of a plane that is detected from the first area by using the 3D plane equation.

In regard to Z of the 3D coordinates (X, Y, Z), there may be no noise or matching may not be accurate, and Z coordinates may not be known. If the Z coordinates are not known, this increases error when calculating the plane equation, and thus, an unknown value needs to be eliminated while calculating. According to the RANSAC algorithm, a smallest number of pixels may be randomly selected, with which a plane equation may be calculated from a pixel set, and then, the plane equation is solved, and other pixels are substituted in the plane equation to designate pixels with small errors, as inliers, and if the number of inliers is equal to or greater than a predetermined ratio of the total number, the inliers are used to calculate the plane equation again. As described above, the plane equation is substituted for all pixels to determine accuracy regarding plane detection, and this operation is repeated several times to determine a result with the smallest error, as a final result.

The filtering unit 540 performs edge-preserving smoothing on the second area including less than three characteristic points, that is, it filters the second area. Edge-preserving smoothing refers to non-linear filtering in which a depth is smoothed while preserving remarkable luminance steps such as limits of an object. For this edge-preserving processing, a bilateral filter may be used.

Figure 13A:
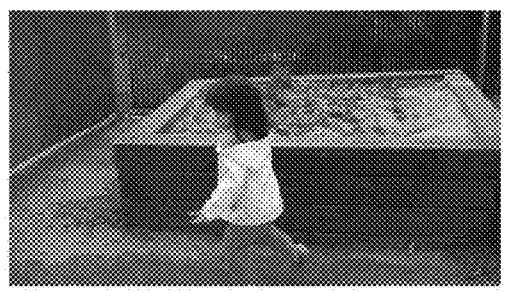
FIGS. 13A and 13B illustrates first and second images output from the first camera 100 and the second camera 200.
Figure 13B:
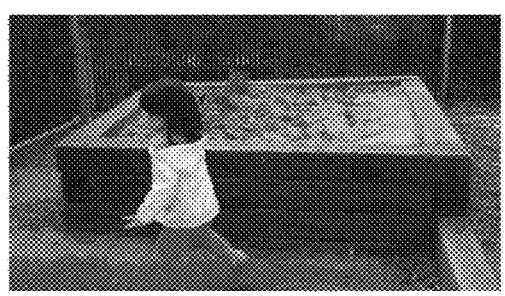
Figure 13C:
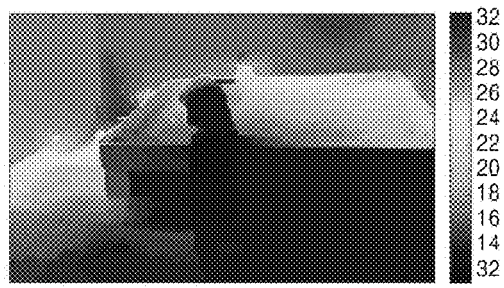
FIG. 13C illustrates a high-density 3D image that is finally reconstructed based on FIGS. 13A and 13B, according to an exemplary embodiment.

The output unit 600 outputs a finally reconstructed high-density 3D image by synthesizing a plane detected from the first area including at least three characteristic points and a result of performing edge-preserving smoothing on the second area including less than three characteristic points. FIGS. 13A and 13B illustrates first and second images output from the first camera 100 and the second camera 200, and FIG. 13C illustrates a high-density 3D image that is finally reconstructed based on FIGS. 13A and 13B.

By performing plane detection and smoothing with respect to an initial 3D image generated by matching images captured using multiple cameras, the initial 3D image may be reconstructed to a high-density 3D image.

Figure 14:
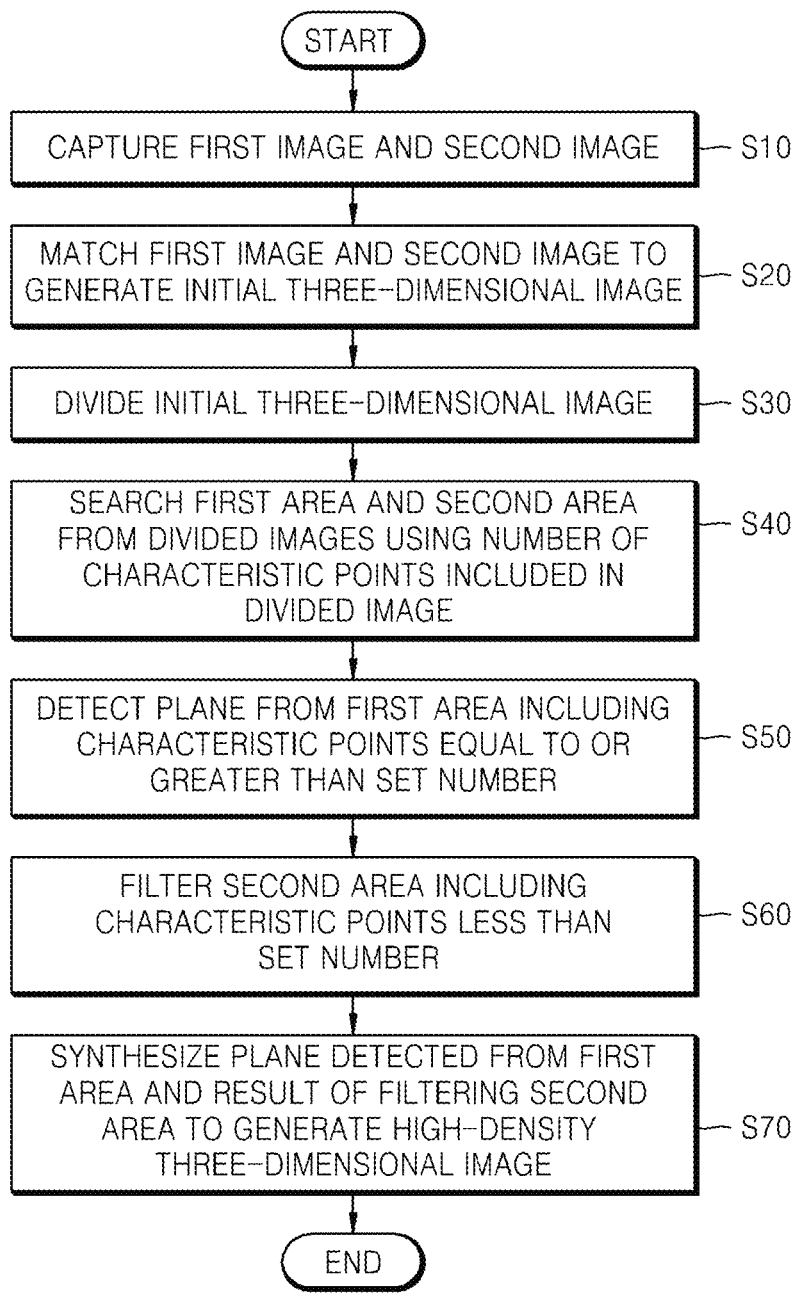
FIG. 14 is a flowchart illustrating a method of reconstructing a high-density 3D image according to an exemplary embodiment.

FIG. 14 is a flowchart illustrating a method of reconstructing a high-density 3D image according to an exemplary embodiment.

Referring to FIG. 14, first, in operation S10, the first camera 100 and the second camera 200 capture a first image and a second image, respectively. When capturing of the first and second images is completed, the image processing unit 300 may perform image processing on the first and second images.

If the first and second images are processed by the image processing unit 300, the image matching unit 400 performs operation S20 of generating an initial 3D image by matching the first and second images on which image processing is performed.

Figure 15:
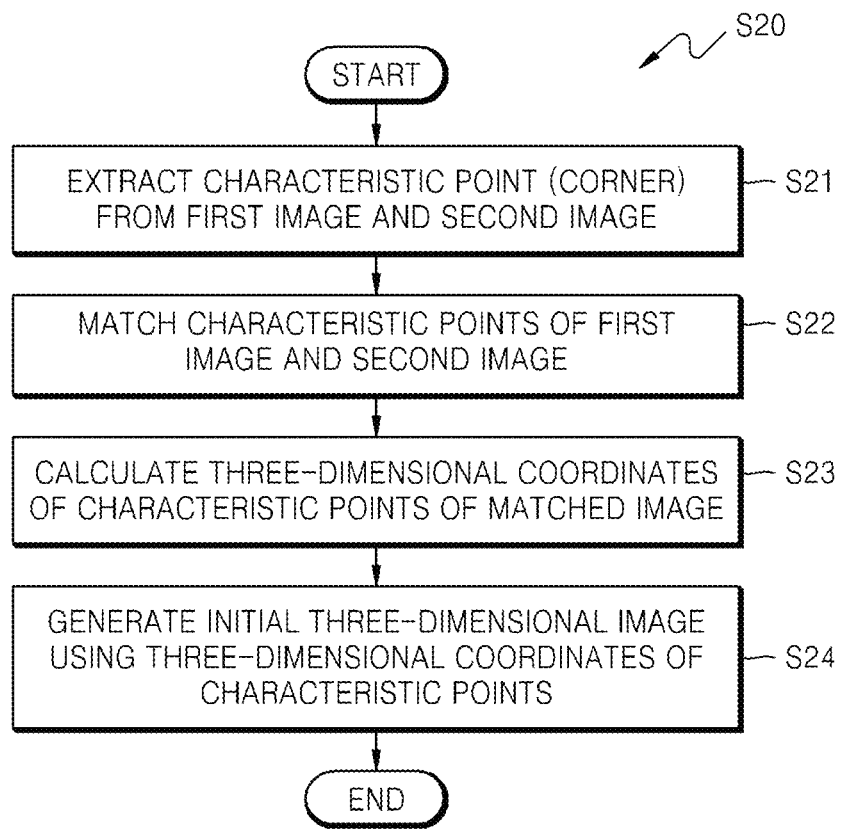
FIG. 15 is a flowchart illustrating an operation of image matching of FIG. 14, according to an exemplary embodiment.

FIG. 15 is a flowchart illustrating an operation of image matching of FIG. 14, according to an exemplary embodiment. Referring to FIG. 15, the image matching unit 400 performs operation S21 of extracting a corner (edge) from the first and second images as a characteristic point by using the SIFT algorithm or the HARRIS algorithm.

When characteristic points are extracted from the first and second images, the image matching unit 400 uses epipolar geometry and an area-based matching method to match the characteristic points of the first and second images in operation S22. When searching for a matching point from the second image with respect to a characteristic point of the first image, the image matching unit 400 sets a narrow search area under the epipolar restriction conditions to find first candidate characteristic points from this area, select a characteristics point of the second image with a most similarity to the characteristics point of the first image, and set the two characteristics points as a conjugate pair. That is, as a reference window, a first window is set on the first image, and the first window is convoluted to the second image to search a second window whose luminance differs by the least degree from that of the first window.

When matching of characteristic points of the first and second images is completed, the image matching unit 400 performs operation S23 of calculating 3D coordinates of characteristic points that are matched using a triangulation method. The image matching unit 400 calculates 2D coordinates of characteristic points from the first image and the second image, that is, it calculates X and Y coordinates, and when calculating Z coordinates, by assuming a distance d between lenses of the first camera 100 and the second camera 200, and inserting angle information θ1 from the first camera 100 to a characteristic point and angle information θ2 from the second camera 200 to the characteristic point into Equation 1, the 3D coordinates of the matched characteristic points are calculated.

When the calculation of the 3D coordinates of characteristic points is completed, in operation S24, the image matching unit 400 uses the 3D coordinates of all characteristic points of the matched image to generate an initial 3D image.

Referring to FIG. 1 again, when an initial 3D image is generated as a result of image matching, the high-density 3D image reconstructing unit 500 uses a graph cut algorithm to divide the initial 3D image in operation S30.

When division of the initial 3D image is completed, the high-density 3D image reconstructing unit 500 searches for at least one first area and at least one second area by using the number of characteristic points included in the divided images in operation S40. The high-density 3D image reconstructing unit 500 searches for at least one area including a set number of characteristic points, for example, at least three characteristic points included in the divided image, and at least one second area including less than the set number of characteristic points, for example, less than three characteristic points included in the divided image.

When the searching of the first and second areas is completed, the high-density 3D image reconstructing unit 500 applies the RANSAC algorithm and a plane equation to the first area including at least three characteristic points to detect a plane in operation S50.

When the plane detection is completed, the high-density 3D image reconstructing unit 500 performs edge-preserving smoothing on the second area including less than three characteristic points, that is, it filters the second area in operation S60, thereby preserving an object outline which relates to visibility and eliminating minute luminance variations.

When the plane detection and filtering are completed, in operation S70, the output unit 600 outputs a finally reconstructed high-density 3D image by synthesizing a plane detected from the first area including at least three characteristic points and a result of performing edge-preserving smoothing on the second area including less than three characteristic points.

As described above, according to the exemplary embodiments, plane detection and smoothing are performed on an initial 3D image that is generated by matching images captured using multiple cameras, thereby reconstructing the initial 3D image to a high-density 3D image.

The exemplary embodiments can be written as computer programs and be implemented in general-use digital computers that execute the computer programs using a computer readable recording medium. Examples of the computer readable recording medium include all kinds of recording devices in which computer readable data is stored.

Examples of the computer readable recording medium include read-only memory (ROM), random-access memory (RAM), CD-ROMs, magnetic tapes, floppy disks, optical data storage devices, etc. The computer readable recording medium can also be distributed over network coupled computer systems so that the computer readable code is stored and executed in a distributed fashion. Also, functional programs, code, and code segments for accomplishing the inventive concept can be easily construed by programmers of ordinary skill in the art to which the inventive concept pertains.

While the inventive concept has been particularly shown and described with reference to exemplary embodiments thereof, it will be understood by those of ordinary skill in the art that various changes in form and details may be made therein without departing from the spirit and scope of the inventive concept as defined by the appended claims. The exemplary embodiments should be considered in descriptive sense only and not for purposes of limitation. Therefore, the scope of the inventive concept is defined not by the detailed description of the exemplary embodiments but by the appended claims, and all differences within the scope will be construed as being included in the inventive concept.

All references, including publications, patent applications, and patents, cited herein are hereby incorporated by reference to the same extent as if each reference were individually and specifically indicated to be incorporated by reference and were set forth in its entirety herein.

What is claimed is:

1. A method of reconstructing a high-density three-dimensional (3D) image, the method comprising:
    generating an initial 3D image by matching a first image captured using a first camera and a second image captured using a second camera;
    searching for a first area and a second area from the initial 3D image by using a number of characteristic points included in the initial 3D image;
    detecting a plane from the first area;
    filtering the second area by performing non-linear filtering in which a depth is smoothed while preserving luminance steps;
    wherein the filtering comprises smoothing depth, corresponding to Z coordinates of the characteristics points, while preserving contrast equal to or greater than a set value with respect to the second area;
    and synthesizing the detected plane and the filtered second area.

2. The method of claim 1, further comprising, after generating the initial 3D image,
    dividing one of the first image and the second image into segments comprising the first and second areas; and
    applying information about the dividing to the initial 3D image.

3. The method of claim 2, wherein the searching for the first and second areas comprises searching for at least one first area including characteristic points a number of which is equal to or greater than a set number.

4. The method of claim 3, wherein the searching for the first and second areas further comprises searching for at least one second area including the characteristic points a number of which is less than the set number.

5. The method of claim 4, wherein the filtering comprises smoothing depth, corresponding to Z coordinates of the characteristics points, while preserving contrast equal to or greater than a set value with respect to the second area.

6. The method of claim 4, wherein the generating the initial 3D image comprises:
    extracting the characteristic points from the first image and the second image;
    matching the characteristic points of the first image and the characteristic points of the second image; and
    calculating 3D coordinates of the matched characteristic points.

7. The method of claim 6, wherein the matching the characteristic points comprises:
    setting a first window including a characteristic point in the first image;
    searching for a second window of which luminance differs by the least degree from luminance of the first window; and
    selecting a matching characteristic point which is the most similar to the characteristic point in the first window among at least one characteristic point in the second window.

8. The method of claim 7, wherein the calculating the 3D coordinates comprises:
    calculating two-dimensional (2D) coordinates of the matched characteristic points with respect to the first and second images; and
    calculating 3D coordinates of the matched characteristic points by using a distance between the first and second cameras and angles of the first and second cameras with respect to the characteristic points.

9. The method of claim 6, wherein the calculating the 3D coordinates comprises:
    calculating two-dimensional (2D) coordinates of the matched characteristic points with respect to the first and second images; and
    calculating 3D coordinates of the matched characteristic points by using a distance between the first and second cameras and angles of the first and second cameras with respect to the characteristic points.

10. The method of claim 1, wherein the generating the initial 3D image comprises:
    extracting characteristic points from the first image and the second image;
    matching the characteristic points of the first image and the characteristic points of the second image;
    calculating 3D coordinates of the matched characteristic points; and
    generating the initial 3D image using the 3D coordinates of the matched characteristic points.

11. The method of claim 1, wherein the searching for the first and second areas comprises searching for at least one first area including characteristic points equal to or greater than a set number and at least one second area including the characteristic points less than the set number.

12. An apparatus for reconstructing a high-density three-dimensional (3D) image, comprising at least one processor which implements:
    an image matching unit which matches a first image captured using a first camera and a second image captured using a second camera to generate an initial 3D image; and
    a 3D image reconstruction unit which divides the initial 3D image into a first area and a second area to detect a plane from the first area, filters the second area by performing non-linear filtering in which a depth is smoothed while preserving luminance steps;
wherein the filtering comprises smoothing depth, corresponding to Z coordinates of the characteristics points, while preserving contrast equal to or greater than a set value with respect to the second area;
and synthesizes the plane detected from the first area and the filtered second area to generate the high-density 3D image.

13. The apparatus of claim 12, wherein the image matching unit comprises:
    a characteristic point extracting unit which extracts characteristic points from the first image and the second image;
    a characteristic point matching unit matching which matches the characteristic points of the first image and the characteristic points of the second image;
    a 3D coordinate calculation unit which calculates 3D coordinates of the matched characteristic points; and
    an initial 3D image generating unit which generates an initial 3D image by using the 3D coordinates of the matched characteristic points.

14. The apparatus of claim 13, wherein the 3D image reconstruction unit comprises:
    a dividing unit which divides one of the first image and the second image, and applying information about the division to the initial 3D image;
    a searching unit which searches for the first area and the second area from the divided image by using a number of characteristic points included in the divided image;
    a plane detection unit which detects a plane from the first area; and
    a filtering unit which filters the second area.

15. The apparatus of claim 14, wherein the searching unit searches for at least one first area including a set number of the characteristic points, and at least one second area including less than the set number of the characteristic points.

16. The apparatus of claim 14, wherein the filtering unit filters the second area to smooth depth, corresponding to Z coordinates of the characteristic points, while the depth discontinuities with respect to the division boundaries.

17. The apparatus of claim 12, wherein the 3D image reconstruction unit comprises:
    a dividing unit which divides one of the first image and the second image, and applies information about the division to the initial 3D image;
    a searching unit which searches for the first area and the second area from the divided image by using a number of 3D characteristic points included in the divided image;
    a plane detection unit which detects a plane from the first area; and
    a filtering unit which filters the second area.

18. A non-transitory computer readable recording medium having embodied thereon a program for executing a method of reconstructing a high-density three-dimensional (3D) image, the method comprising:
    generating an initial 3D image by matching a first image captured using a first camera and a second image captured using a second camera;
    searching for a first area and a second area from the initial 3D image by using a number of characteristic points included in the initial 3D image;
    detecting a plane from the first area;
    filtering the second area by performing non-linear filtering in which a depth is smoothed while preserving luminance steps;
    wherein the filtering comprises smoothing depth, corresponding to Z coordinates of the characteristics points, while preserving contrast equal to or greater than a set value with respect to the second area;
    and synthesizing the detected plane and the filtered second area.

* * * * *